United States Patent
Vaultier et al.

(10) Patent No.: US 11,479,618 B2
(45) Date of Patent: Oct. 25, 2022

(54) FUNCTIONALISED POLYBUTADIENE SYNTHESIS PROCESS

(71) Applicant: COMPAGNIE GENERALE DES ETABLISSEMENTS MICHELIN, Clermont-Ferrand (FR)

(72) Inventors: Florent Vaultier, Clermont-Ferrand (FR); Gael Courbes, Clermont-Ferrand (FR); Rokhiyatou Said-Diatta, Clermont-Ferrand (FR); Benoit De Gaudemaris, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 142 days.

(21) Appl. No.: 17/058,320

(22) PCT Filed: May 23, 2019

(86) PCT No.: PCT/FR2019/051192
§ 371 (c)(1),
(2) Date: Nov. 24, 2020

(87) PCT Pub. No.: WO2019/224495
PCT Pub. Date: Nov. 28, 2019

(65) Prior Publication Data
US 2021/0198386 A1 Jul. 1, 2021

(30) Foreign Application Priority Data

May 25, 2018 (FR) .................................... 1854460

(51) Int. Cl.
| C08C 19/25 | (2006.01) |
| C08C 19/44 | (2006.01) |
| C08F 236/06 | (2006.01) |
| C08K 3/36 | (2006.01) |

(52) U.S. Cl.
CPC ............. C08C 19/25 (2013.01); C08C 19/44 (2013.01); C08F 236/06 (2013.01); C08K 3/36 (2013.01)

(58) Field of Classification Search
CPC ....... C08C 19/25; C08C 19/44; C08F 236/06; C08K 3/36
USPC ........................................................ 524/588
See application file for complete search history.

(56) References Cited

U.S. PATENT DOCUMENTS

| 6,977,281 B1 * | 12/2005 | Ozawa ................. C08F 136/04 525/383 |
| 7,056,998 B2 * | 6/2006 | Laubry .................. C08F 36/04 502/132 |
| 2005/0130835 A1 | 6/2005 | Laubry et al. |

FOREIGN PATENT DOCUMENTS

| WO | 0134658 A1 | 5/2001 |
| WO | 0134659 A1 | 5/2001 |
| WO | 03097708 A1 | 11/2003 |

OTHER PUBLICATIONS

International Search Report with Written Opinion corresponding to PCT/FR2019/051192 dated Oct. 11, 2019.

* cited by examiner

*Primary Examiner* — Kelechi C Egwim
(74) *Attorney, Agent, or Firm* — Dickinson Wright PLLC

(57) ABSTRACT

A process for preparing a functionalized polybutadiene is provided. The process comprises the following steps:
a) homopolymerising butadiene with a catalytic system based on at least one preforming conjugated diene, a salt of one or more rare earth metals of an organic phosphoric acid, an aluminium-containing alkylating agent, an alkylaluminium halide;
b) adding a polyfunctional compound to the pseudo-living elastomer formed in step (a); and
c) adding a functionalizing agent to the mixture formed in step (b).

The total molar amount of aluminium in the polymerization medium is such that the (aluminium/rare earth salt) molar ratio has a value between 1 and 5 and the polymerization is carried out at a temperature between 40° C. and 90° C.

A functionalized polybutadiene that can be obtained by the process, and a rubber composition containing the functionalized polybutadiene is also provided.

19 Claims, No Drawings

FUNCTIONALISED POLYBUTADIENE SYNTHESIS PROCESS

This application is a 371 national phase entry of PCT/FR2019/051192 filed on 23 May 2019, which claims benefit of French Patent Application No. 1854460, filed 25 May 2018, the entire contents of which are incorporated herein by reference for all purposes.

BACKGROUND

1. Technical Field

The present invention relates to a process for synthesizing polybutadiene, having a high content of cis-1,4 linkages, exhibiting both a polydispersity index of less than 2.3 and a high average percentage of functionalized chains under industrially realistic conditions. The polybutadiene also exhibits reduced cold flow.

2. Related Art

Now that savings in fuel and the need to protect the environment have become a priority, it is desirable to produce blends that have good mechanical properties and hysteresis that is as low as possible in order to be able to use them in the form of rubber compositions that may be used for the manufacture of various semi-finished products included in the composition of tyres.

Many solutions have already been experimented with in order to achieve the objective of a fall in hysteresis. Mention may be made in particular of modification of the structure of diene polymers and copolymers by means of functionalizing agents, with the aim of obtaining good interaction between the polymer thus modified and the filler, whether it is silica or another reinforcing filler.

There is a vast literature concerning the functionalization of polymers obtained by anionic polymerization. The functionalization can take place either during the initiation of polymerization by means of an initiator bearing the function to be incorporated into the elastomer chain, or during a post-polymerization reaction by means of a functionalizing agent. Agents making it possible to introduce all kinds of functions into the polymer are known to those skilled in the art and widely described.

Anionic polymerization makes it possible to control, to a certain extent, the microstructure of the polymers synthesized. However, it is not possible by this type of polymerization to synthesize polymers having a high content of cis-1,4 linkages (also called polymers having a high cis content).

Polymers having a high content of cis-1,4 linkages are essentially prepared by coordination catalysis polymerization. A very full literature dealing with this type of catalysis also exists.

For the preparation of butadiene homopolymers having a high content of cis-1,4 linkages, it is known practice to use catalytic systems based on:
  a rare earth salt in solution in a hydrocarbon-based solvent,
  an alkylating agent for this salt consisting of an alkylaluminium, and
  a halide of an alkylaluminium.

Patent documents WO-A-02/38636 and WO-A-03/097708 teach, for obtaining polybutadienes, the use of a catalytic system of "preformed" type based on at least:

a preforming conjugated diene, such as butadiene,
a salt of one or more rare earth metals of an organic phosphoric acid, which is in suspension in at least one inert, saturated hydrocarbon-based solvent of aliphatic or alicyclic type,
an alkylating agent consisting of an alkylaluminium of formula $AlR_3$ or $HAlR_2$, and
a halogen donor which belongs to the alkylaluminium halide family, excluding alkylaluminium sesquihalides.

The polybutadienes obtained by means of this catalytic system exhibit in particular a polydispersity index of less than 2.1 and a Mooney viscosity ML (1+4) at 100° C. of greater than or equal to 40. These combined characteristics make these polybutadienes well suited for use in tyre casing treads.

The functionalization of these polymers having a high cis content is less widespread due to the very nature of the catalytic systems used.

In the case of anionic polymerization, it is possible to obtain a quantitative functionalization of the chain ends by termination on nucleophilic molecules by virtue of the absence of a transfer or deactivation reaction. In the case of polymerization by catalysis, the secondary transfer and termination reactions can be significant and can generate a significant drop in the amount of functionalizable chains. All of these factors do not make it possible to obtain high contents of functionalized chains in the case of polymerization catalysis under industrial conditions.

In order to remedy this problem, many conduct the polymerization at a polymerization temperature of less than 40° C., or even of about 30° C., in order to reduce the thermal deactivation reactions. However, carrying out this reaction at less than 40° C. strongly penalizes the productivity of the process at the industrial level.

In order to remedy this problem, it has also been proposed to significantly modify the polymerization catalyst used in order to reduce the transfer reactions to aluminium (FR2939800A1 & FR2939801A1). However, this solution is industrially expensive.

In addition, the polybutadiene obtained exhibits a high cold flow.

Definitions

In this description, any range of values denoted by the expression "between a and b" represents the range of values extending from more than a to less than b (i.e. limits a and b excluded), while any range of values denoted by the expression "from a to b" means the range of values extending from a up to b (i.e. including the strict limits a and b).

In the present description, "polybutadiene" will also be referred to as "elastomer". It is a homopolymer obtained by polymerization of butadiene.

In the present description, the expression "high cis content" in relation to the elastomer means a molar content of 1,4-cis unit linkage of at least 90% relative to the elastomer.

In the present description, the expression "pseudo-living", in relation to the elastomer, means that all or some of these chain ends of the elastomer are reactive, in particular with respect to functionalizing agents.

In the present description, the "functionalized chains" denote the polybutadiene chains having reacted with the functionalizing agent, of formula $A-R_f-B$, as subsequently defined.

In the present description, the average percentage of functionalized chains is the ratio between the weight of the functionalized polybutadiene chains relative to the total weight of polybutadiene chains. It is determined by multiplying the number of functions, $CH_2$—Si/PB, in moles per unit mass of the polymer, by the number-based molar mass of said polymer. The number of functions, in moles per unit mass of the polymer, is determined by $^1H$ NMR according to the protocol described in the introduction to the examples.

In the present description, the term "rare earth" is understood to mean a metal selected from yttrium, scandium and lanthanides, metals having an atomic number ranging from 57 to 71 inclusive in Mendeleev's periodic table of the elements. The rare earth metal is preferably selected from lanthanides, neodymium being more particularly preferred.

In the present description, the expression "based on" used to define the constituents of the catalytic system is understood to mean the mixture of these constituents and/or the product of the reaction between these constituents.

In the present description, the term "phr" means part by weight per hundred parts of total elastomer.

In the present description, the term "solution polymerization" is understood to mean polymerization carried out in a reaction medium comprising from 70% to 99% by weight of an organic solvent, relative to the total weight of the monomers and of said organic solvent.

In the present description, the term "semi-bulk polymerization" is understood to mean polymerization carried out in a reaction medium comprising between 0% and 70% by weight of an organic solvent, relative to the total weight of the monomers and of said organic solvent.

In the present description, the term "bulk polymerization" is understood to mean polymerization carried out in a reaction medium not comprising an organic solvent.

SUMMARY

The technical problem addressed by embodiments of the invention is that of having a competitive, economical and flexible synthesis process, that can be adapted to industrial production, making it possible to produce a functionalized polybutadiene having a high 1,4-cis content, exhibiting a high average percentage of functionalized chains. The functionalized polybutadiene advantageously has a low cold flow.

The invention presented herein therefore can include a process for obtaining a polybutadiene having a high content of cis-1,4 linkages, exhibiting both a polydispersity index of less than 2.3 and an average percentage of functionalized chains that is sufficiently high under industrially realistic conditions. In addition, it also has a reduced cold flow.

A subject of the invention is a process for preparing a functionalized polybutadiene, characterized in that it comprises the following steps:
a) homopolymerising butadiene by means of a catalytic system so as to form a pseudo-living elastomer, said catalytic system being based on at least:
  one conjugated diene monomer,
  a salt of one or more rare earth metals of an organic phosphoric acid,
  an aluminium-containing alkylating agent, and
  a halogen donor, comprising an alkylaluminium halide,
said salt is in suspension or in solution in at least one saturated inert hydrocarbon-based solvent of aliphatic or alicyclic type;
b) adding a polyfunctional compound comprising at least three functional groups to the pseudo-living elastomer formed in step (a), said functional group being capable of reacting with the reactive end of the pseudo-living elastomer;
c) adding a functionalizing agent corresponding to the formula $A-R_f-B$ to the mixture formed in step (b), with A denoting a group capable of reacting with the reactive end of the pseudo-living elastomer, $R_f$ denoting an atom or a group of atoms forming a bond between A and B, and B denoting a function capable of reacting with a reinforcing filler;
d) recovering the functionalized polybutadiene;
and in that the total molar amount of aluminium in the polymerization medium is such that the (aluminium/rare earth salt) molar ratio has a value between 1 and 5 and in that the polymerization is carried out at a temperature between 40° C. and 90° C.

An important characteristic of this process is the (aluminium/rare earth salt) molar ratio.

In the polymerization medium, the total molar amount of aluminium is such that the (aluminium/rare earth salt) molar ratio, in particular the (aluminium/neodymium salt) molar ratio, has a value between 1 and 5, advantageously between 1 and 4, more advantageously ranging from 2.5 to 3.8.

The aluminium is provided by the catalytic system and also, where appropriate, by a supplementary addition to the alkylaluminium polymerization medium as described below.

Surprisingly, it has been observed that this (aluminium/rare earth salt) molar ratio influences the average percentage of functionalized chains.

Another important characteristic of this process is the polymerization temperature which is above 40° C., making the process suitable for implementation on an industrial scale.

The polymerization temperature is between 40° C. and 90° C., advantageously between 40° C. and 80° C., more advantageously between 45° C. and 75° C., and advantageously ranges from 50° C. to 70° C.

Another important characteristic of the process according to the invention is the order of addition of the polyfunctional compound and functionalizing agent: the polyfunctional compound is added before introduction of the functionalizing agent.

The polyfunctional compound/aluminium molar ratio is advantageously less than 0.3, more advantageously between 0.01 and 0.3.

The functionalizing agent/aluminium molar ratio is advantageously at least 1, as described below.

Thus, relative to the aluminium, the polyfunctional compound is lacking while the functionalizing agent is in an equimolar amount or in excess.

Here again, the aluminium is provided by the catalytic system and also, where appropriate, by a supplementary addition to the alkylaluminium polymerization medium.

A subject of the invention is also the polybutadiene obtained by means of the process according to the invention, which is characterized in particular by:
  its molar content of 1,4-cis unit linkage of at least 90% relative to the polybutadiene;
  its polydispersity index of less than 2.3;
  its average percentage of functionalized chains greater than 25%;
  advantageously, its Mooney viscosity ML (1+4) at 100° C. greater than or equal to 40;
  its cold flow CF (1+6) value at 100° C. of less than 1 g, more advantageously less than 0.5 g.

A subject of the invention is also a rubber composition comprising a functionalized polybutadiene according to the invention and a reinforcing inorganic filler.

DETAILED DESCRIPTION

Certain aspects of the process according to the invention and of the other subjects of the invention will now be described in detail. All the aspects and variants subsequently described can be combined with one another.

I—Step (a)

Catalytic System

The catalytic system is a catalytic system of "preformed" type based on at least:
one conjugated diene monomer,
a salt of one or more rare earth metals of an organic phosphoric acid, said salt being in suspension or in solution in at least one inert, saturated hydrocarbon-based solvent of aliphatic or alicyclic type,
an alkylating agent comprising aluminium, the (alkylating agent/rare earth salt) molar ratio advantageously having a value between 1 and 4, and
a halogen donor, comprising an alkylaluminium halide.

The catalytic system can be prepared batchwise or continuously. The catalytic system can be introduced directly into the reactor or can be mixed beforehand with at least one of the other components which feed the polymerization reactor.

The inert hydrocarbon-based solvent in which said rare earth salt is in suspension or in solution is advantageously an aliphatic or alicyclic low-molecular-weight solvent, such as cyclohexane, methylcyclohexane, n-heptane, pentane, or a mixture of these solvents.

According to another characteristic of the invention, said catalytic system is such that said rare earth salt has a rare earth metal weight content ranging from 12.0% to 13.5%, determined both by the complexometric back titration technique with diethylenediaminetetracetic acid (abbreviated to EDTA) and by the inductively coupled plasma/atomic emission spectrometry (abbreviated to ICP/AES) technique. Preferably, said rare earth salt has a rare earth metal weight content ranging from 12.5% to 13.2%.

The rare earth organic phosphoric acid salt is advantageously a rare earth tris(organophosphate), it being possible for the organophosphate to be selected from phosphoric acid diesters of general formula (R'O)(R"O)PO(OH), in which R' and R", which may be identical or different, represent an alkyl, aryl or alkylaryl radical. By way of example, mention may be made of neodymium tris[dibutyl phosphate], neodymium tris[dipentyl phosphate], neodymium tris[dioctyl phosphate], neodymium tris[bis(2-ethylhexyl) phosphate], neodymium tris[bis(1-methylheptyl) phosphate], neodymium tris[bis(p-nonylphenyl) phosphate], neodymium tris[butyl(2-ethylhexyl) phosphate], neodymium tris[(1-methylheptyl)(2-ethylhexyl) phosphate], neodymium tris[(2-ethylhexyl)(p-nonylphenyl) phosphate], neodymium tris[bis(2-ethylhexyl) phosphate], neodymium tris[bis(oleyllyl) phosphate] or neodymium tris[bis(lineolyl) phosphate].

In particular, a tris[bis(2-ethylhexyl) phosphate] of said rare earth metal(s) is used as rare earth salt. Even more preferentially, said rare earth salt is neodymium tris[bis(2-ethylhexyl) phosphate].

As conjugated diene monomer which can be used for preforming the catalytic system according to the invention, mention may preferentially be made of 1,3-butadiene.

Mention may also be made of 2-methyl-1,3-butadiene (or isoprene), 2,3-di($C_1$ to $C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, or any other conjugated diene having between 4 and 8 carbon atoms.

As alkylating agent which can be used in the catalytic system according to the invention, mention may be made of alkylaluminiums selected from trialkylaluminiums of formula $Al(R)_3$ or dialkylaluminium hydrides of formula $HAl(R)_2$. The alkyl group, R, advantageously contains from 1 to 20 carbon atoms, more advantageously from 1 to 12 carbon atoms. Mention may be made, as tri(alkylaluminium), of triethylaluminium, triisopropylaluminium, tri-isobutylaluminium, tributylaluminium or trioctylaluminium. Mention may be made, as di(alkylaluminium) hydride, of diisobutylaluminium hydride.

As halogen donor which can be used in the catalytic system according to the invention, mention may be made of using an alkyl halide, an alkylaluminium halide or an alkylaluminium sesquihalide. An alkylaluminium halide is preferentially used, the alkyl group comprising from 1 to 8 carbon atoms. Among these, diethylaluminium chloride is preferred.

According to another characteristic of the invention, the rare earth metal(s) are present in the catalytic system in a concentration greater than or equal to 0.005 mol/l and, preferably, ranging from 0.010 to 0.1 mol/l and more particularly ranging from 0.02 mol/l to 0.08 mol/l.

According to variants of the invention, the (alkylating agent/rare earth salt(s)) molar ratio in said catalytic system advantageously has a value ranging from 1 to 2.

According to variants of the invention, the (halogen donor/rare earth salt) molar ratio has a value ranging from 2 to 3.6 and even more preferentially from 2.4 to 3.2, even more preferentially ranging from 2.5 to 3.

According to variants of the invention, the (preforming monomer/rare earth salt(s)) molar ratio has a value ranging from 15 to 70, or even from 25 to 50.

A process for preparing such a catalytic system is for example described in patent application WO 02/38636.

Staggered Addition of Alkylaluminium

According to variant embodiments of the catalytic polymerization process in accordance with the invention, it is possible to introduce into the polymerization reactor, by a stream independent of the introduction of the catalytic system used for the polymerization reaction, a predetermined additional amount of at least one alkylaluminium compound of formulas $Al(R)_3$ or $HAl(R)_2$ or $(R'''')_nAl(R''')_{3-n}$, in which R and R''' represent an optionally saturated alkyl group of 1 to 20 carbon atoms, preferentially from 1 to 12 carbon atoms, R'''' represents an allyl group, n an integer from 1 to 3 inclusive.

As alkylaluminium compound, mention may be made of alkylaluminiums such as:
trialkylaluminiums such as, for example, trimethylaluminium, triethylaluminium, tri-n-propylaluminium, tri-isopropylaluminium, tri-n-butylaluminium, tri-(t-butyl)aluminium, triisobutylaluminium, tri-n-pentylaluminium, tri-n-hexylaluminium, tricyclohexylaluminium, preferably triisobutylaluminium, or
dialkylaluminium hydrides such as, for example, diethylaluminium hydride, diisopropylaluminium hydride, di-n-propylaluminium hydride, diisobutylaluminium hydride, di-n-octylaluminium hydride, di-n-butylaluminium hydride, preferably diisobutylaluminium hydride.

Advantageously, the (alkylaluminium compound added in staggered manner/alkylaluminium in the catalytic system) molar ratio ranges from 1/20 to 50/1, preferentially ranges from 1/15 to 30/1 and even more preferentially from 1/10 to 20/1.

The amount of alkylaluminium added is such that, in the polymerization medium, the molar ratio of the total molar amount of aluminium, relative to the molar amount of rare earth salt, in particular of neodymium salt, is always within the range defined above.

Polymerization Solvent

According to one implementation of the invention, the polymerization is carried out in bulk. In this case, there is no addition of polymerization solvent.

According to other implementations of the invention, the polymerization is carried out in solution or in semi-bulk. The medium then comprises an inert hydrocarbon-based polymerization solvent, which is preferably an aliphatic or alicyclic low-molecular-weight solvent, in particular for environmental reasons. Examples that may be mentioned include n-pentane, isopentane, isoamylenes (2-methyl-2-butene, 2-methyl-1-butene and 3-methyl-1-butene), 2,2-dimethylbutane, 2,2-dimethylpropane (neopentane), n-heptane, n-octane, isooctane, cyclopentane, cyclohexane, n-hexane, methylcyclopentane and methylcyclohexane, and also mixtures of these compounds, n-pentane being particularly preferred. Solvents that may also be mentioned include aromatic hydrocarbons, for instance benzene or toluene.

The solvent can be introduced directly into the reactor. It can also be mixed beforehand with at least one other of the components introduced into the polymerization reactor, in particular with the monomer to be polymerized.

Polymerization Temperature

An important characteristic of the polymerization process of step (a) is the polymerization temperature which is greater than 40° C., making the process suitable for implementation on an industrial scale.

The polymerization temperature is between 40° C. and 90° C., advantageously between 40° C. and 80° C., more advantageously between 45° C. and 75° C., and advantageously ranges from 50° C. to 70° C.

II—Step (b)

According to the invention, a polyfunctional compound is added to the pseudo-living elastomer formed in step (a).

This polyfunctional compound comprises at least three functional groups and will thus make it possible to link several polybutadiene chains together. Advantageously, this polyfunctional compound comprises at least four functional groups.

This polyfunctional compound may be a small molecule bearing at least three, advantageously at least four, functional groups or a polymer bearing these at least three, advantageously at least four, functional groups.

In the polyfunctional compound, the functional groups are advantageously identical.

In addition, the functional groups are advantageously identical to the functional group A of the functionalizing agent described below.

The polyfunctional compound advantageously corresponds to the formula $(E)_n$-$R_j$, with n denoting an integer greater than or equal to 3, E denoting said functional group, and $R_j$ denoting an atom or a group of atoms bearing the n groups E.

In a first embodiment, $R_j$ is a linear, branched or cyclic hydrocarbon-based radical, and may contain one or more aromatic radicals, and/or one or more heteroatoms. Advantageously, $R_j$ comprises one or more aromatic radicals. In addition to the n substituents E, said radical $R_j$ can optionally be substituted, provided that the other substituents are inert with respect to the reactive ends of the pseudo-living elastomer.

In a second embodiment, $R_j$ is a polymeric hydrocarbon-based chain.

Advantageously, in one or other of these embodiments, R does not comprise an Si—O—Si chain.

The functional group E is advantageously selected from epoxides, glycidyloxys, glycidylaminos, isocyanates, imines, aziridines and imidazoles. More advantageously, the functional group E is selected from glycidylaminos, isocyanates, imines and imidazoles.

The polyfunctional compound is advantageously selected from triglycidylaminophenol, tetraglycidylaminodiphenylmethane (TGMDA), N,N-diglycidyl-4-glycidyloxyaniline, tris(4-hydroxyphenyl)methane triglycidyl ether, 1,3-bis(N, N'-diglycidylaminomethyl)cyclohexane, tetraglycidylxylenediamine, polymethylenepolyphenylpolyisocyanate, tetra(isocyanato)silane (CAS No.: 3410-77-3), phenyltris (methylethylketoximio)silane (CAS No.: 34036-80-1), poly [[1,3-bis[3-(4,5-dihydro-1H-imidazol-1-yl)propyl]-1,3:1,3-disiloxanedylidene]-1,3-bis(oxy)] (CAS No.: 1325615-33-5).

The polyfunctional compound/aluminium molar ratio is advantageously less than 0.3, more advantageously between 0.01 and 0.3.

Here again, the amount of aluminium corresponds to the total amount of aluminium present in the reaction medium, taking into account the aluminium included in the catalytic system and, where appropriate, the aluminium included in the additional alkylaluminium compound added in staggered fashion relative to the catalytic system.

Step (b) of reacting at least one polyfunctional compound with the pseudo-living elastomer solution is advantageously carried out at a temperature between 40° C. and 90° C., more advantageously between 40° C. and 80° C., even more advantageously between 45° C. and 75° C., and advantageously ranging from 50° C. to 70° C.

III—Step (c)

According to the invention, in step (c), a functionalizing agent capable of reacting with the pseudo-living elastomer of step (b) is introduced.

The functionalizing agent corresponds to the formula A-Ri-B with A denoting a group capable of reacting with the reactive end of the pseudo-living elastomer, Ri denoting an atom or a group of atoms forming a bond between A and B, and B denoting a function capable of reacting with a reinforcing filler.

The group Ri is preferably a linear, branched or cyclic hydrocarbon-based divalent radical, and may contain one or more aromatic radicals, and/or one or more heteroatoms. Said radical Ri can optionally be substituted, provided that the other substituents are inert with respect to the reactive ends of the pseudo-living elastomer. According to preferred variants, the group Ri denotes a saturated or unsaturated, cyclic or non-cyclic, aliphatic divalent $C_1$-$C_{18}$, advantageously $C_1$-$C_{10}$, more advantageously $C_1$-$C_6$, more advantageously $C_1$-$C_3$ or $C_2$-$C_8$, hydrocarbon-based radical, which may contain one or more aromatic radicals. In particular, $R_i$ is an aliphatic divalent $C_1$-$C_3$ radical. In particular, $R_i$ is an aliphatic divalent $C_2$-$C_8$ radical.

According to variants of the invention, the expression "group capable of reacting with the reactive end of the pseudo-living elastomer" is understood to mean a group selected in particular from epoxides, glycidyloxys, glycidylaminos, isocyanates, imines, aziridines and imidazoles. More advantageously, the group capable of reacting with the reactive end of the pseudo-living elastomer is selected from glycidylaminos, isocyanates, imines and imidazoles.

According to variants of the invention, the term "function capable of interacting with a reinforcing filler" is understood to mean a functional group comprising one or more functions selected from a tertiary, protected or unprotected secondary or protected or unprotected primary amine, an imine, an imide, an amide, a nitrile, an azo, a carbamate, a methacrylate, a methacrylamide, a hydroxyl, a carbonyl, a carboxyl, an epoxy, a glycidyloxy, a thiol, a sulfide, a disulfide, a thiocarbonyl, a thioester, a sulfonyl, a silane, a silanol, an alkoxysilane, an alkoxydialkylsilane, a dialkoxysilane, a dialkoxyalkylsilane, a trialkoxysilane, a stannyl, a tin halide, an alkyltin halide, an aryltin halide, a polyether, a nitrogenous heterocycle, an oxygen-comprising heterocycle, a sulfur-comprising heterocycle and an aromatic group substituted with the groups mentioned above.

For example, preference may be given, according to certain variants, to the dialkoxysilane function, in particular the diethoxysilane function, in particular a dialkoxyalkylsilane such as a diethoxyalkylsilane, as a function capable of interacting with a reinforcing filler.

The various preferential or non-preferential aspects above which relate in particular to the nature of the group A, of the group Ri and of the function B can be combined with one another. Thus, depending on the synthesis difficulties and the commercial availabilities, but above all depending on the type of reinforcing filler envisaged in combination with the modified elastomer, those skilled in the art will know which combinations, in particular those of combinations of the groups A and B mentioned above, are particularly advantageous.

By way of illustrations of these variants, mention may be made of functionalizing agents such as (3-glycidyloxypropyl)methyldiethoxysilane, N-(3-diethoxy(methyl)silylpropyl)-4,5-dihydroimidazole, 2-(3,4-epoxycyclohexyl)ethylmethyldiethoxysilane, tris(3-diethoxy(methyl)silylpropyl) isocyanurate and 3-isocyanatopropylmethyldiethoxysilane. Among these functionalizing agents, (3-glycidyloxypropyl) methyldiethoxysilane and 3-isocyanatopropylmethyldiethoxysilane are particularly advantageous.

The functionalizing agent/aluminium molar ratio is advantageously at least 1.

According to variants of the invention, the (functionalizing agent/aluminium) molar ratio is at least 1/1 and at most 10/1, preferentially at most 5/1, or even at most 2/1.

Thus, relative to the aluminium, the polyfunctional compound is lacking while the functionalizing agent is in an equimolar amount or in excess.

Here again, the amount of aluminium corresponds to the total amount of aluminium present in the reaction medium, taking into account the aluminium included in the catalytic system and, where appropriate, the aluminium included in the additional alkylaluminium compound added in staggered fashion relative to the catalytic system.

An important characteristic of the process according to the invention is the order of addition of the polyfunctional compound and functionalizing agent: the polyfunctional compound is added before introduction of the functionalizing agent.

The functionalizing step (c) is advantageously carried out at a temperature between 40° C. and 90° C., more advantageously between 40° C. and 80° C., even more advantageously between 45° C. and 75° C., and advantageously ranging from 50° C. to 70° C.

IV—Step (d)

At this stage and according to a variant of the invention, the process for synthesizing a functionalized polybutadiene can be continued in a manner known per se. Thus, according to one implementation, it is possible to inject a stopper and an anti-oxidant in this step.

The process is then continued in a manner known per se with the separation and recovery of the functionalized polybutadiene prepared. The unreacted butadiene and/or the solvent can be removed, according to methods known to those skilled in the art.

The functionalized polybutadiene recovered at the end of these various steps can then be packaged in a manner known per se, in the form of balls for example.

The process of the invention makes it possible to synthesize, by coordination catalysis, functionalized polybutadienes characterized by a cis molar content of at least 90% relative to the polybutadiene, and by an average percentage of functionalized chains of at least 40%.

V—Functionalized Polybutadiene and Compositions

Another subject of the invention is a functionalized polybutadiene that can be obtained by means of the process according to the invention.

The functionalized polybutadiene according to the invention is characterized in particular by:
  its molar content of 1,4-cis unit linkage of at least 90% relative to the polybutadiene;
  its polydispersity index of less than 2.3;
  its average percentage of functionalized chains greater than 25%, advantageously of between 25% and 80%. In one embodiment, the functionalized polybutadiene has an average percentage of functionalized chains of between 25% and 60%. In another embodiment, the functionalized polybutadiene has an average percentage of functionalized chains of between 40% and 80%, advantageously between 40% and 70%.

The functionalized polybutadiene comprises free polybutadiene chains which have reacted only with the functionalizing agent and polybutadiene chains bonded together via the polyfunctional compound.

The functionalized polybutadiene is characterized in particular by its Mooney viscosity ML (1+4) at 100° C. of greater than or equal to 40, in particular ranging from 40 to 80.

The functionalized polybutadiene exhibits reduced flow, which can be characterized in particular by a cold flow CF (1+6) value at 100° C. of the functionalized polybutadiene of less than 1 g, more advantageously less than 0.5 g, even more advantageously less than 0.2 g.

A subject of the present invention is also a rubber composition comprising a polybutadiene according to the invention or that can be obtained by means of the process according to the invention.

The rubber composition advantageously comprises a reinforcing filler, in particular an inorganic filler such as silica, an organic filler such as carbon black or else mixtures of inorganic filler and organic filler, such as mixtures of silica and carbon black.

The composition can comprise one type of silica or a blend of several silicas. The silica used may be any reinforcing silica known to those skilled in the art, especially any precipitated or fumed silica with a BET surface area and a CTAB specific surface area that are both less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in application EP-A-0735088, or the silicas with a high specific surface area as described in application WO 03/16837.

Those skilled in the art will understand that, as filler equivalent to the silica described above, use might be made of a reinforcing filler of another nature, especially organic nature, provided that this reinforcing filler is covered with a layer of silica or else comprises functional sites, in particular hydroxyl sites, at its surface which require the use of a coupling agent in order to form the bond between the filler and the elastomer.

All carbon blacks, in particular the blacks conventionally used in tyres or their treads, are suitable as carbon blacks. Among these, there will be mentioned more particularly the reinforcing carbon blacks of the 100, 200 or 300 series, or the blacks of the 500, 600 or 700 series (ASTM grades), such as for example the blacks N115, N134, N234, N326, N330, N339, N347, N375, N550, N683, N772 to name but a few. These carbon blacks can be used as available commercially or in any other form.

The rubber composition can advantageously be used in the manufacture of a tyre, more particularly for the preparation of compositions for a tread.

EXAMPLES

Description of Measurement Methods:
Mooney Viscosity

For the polymers and rubber compositions, the Mooney viscosities ML (1+4) at 100° C. are measured according to standard ASTM D 1646 (December 2015).

Use is made of an oscillating consistometer as described in standard ASTM D 1646. The Mooney plasticity measurement is carried out according to the following principle: the elastomer or the composition in the raw state (i.e. before curing) is moulded in a cylindrical chamber heated to 100° C. After preheating for one minute, the rotor rotates within the test specimen at 2 revolutions/minute and the working torque for maintaining this movement after rotating for 4 minutes is measured. The Mooney plasticity ML (1+4) is expressed in "Mooney unit" (MU, with 1 MU=0.83 N·m).

The difference between the Mooney viscosity of the composition and the Mooney viscosity of the elastomer makes it possible to measure the raw processability or processing. The smaller this difference, the better the raw processing.

Differential Calorimetry

The glass transition temperatures (Tg) of the elastomers are determined using a differential calorimeter ("differential scanning calorimeter") with a scanning speed of 20° C./min.

Near-Infrared (NIR) Spectroscopy

The microstructure of the elastomers is characterized by the near-infrared (NIR) spectroscopy technique.

Near-infrared (NIR) spectroscopy is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by $^{13}$C NMR. The microstructure is then calculated from the NIR spectrum of an elastomer film approximately 730 μm in thickness. The spectrum is acquired in transmission mode between 4000 and 6200 cm$^{-1}$ with a resolution of 2 cm$^{-1}$ using a Bruker Tensor 37 Fourier-transform near-infrared spectrometer equipped with an InGaAs detector cooled by the Peltier effect.

Intrinsic Viscosity

The intrinsic viscosity of the elastomers at 25° C. is determined from a 0.1 g·dl$^{-1}$ solution of elastomer in toluene, according to the following principle:

The intrinsic viscosity is determined by the measurement of the flow time t of the polymer solution and of the flow time to of the toluene in a capillary tube.

The flow time of the toluene and the flow time of the 0.1 g·dl$^{-1}$ polymer solution are measured in an Ubbelohde tube (diameter of the capillary 0.46 mm, capacity 18 to 22 ml) placed in a bath thermostatically controlled at 25±0.1° C.

The intrinsic viscosity is obtained by the following relationship:

$$\eta_{inh} = \frac{1}{C} \ln\left[\frac{(t)}{(t_0)}\right]$$

where:
C: concentration of the solution of polymer in toluene in g·dl$^{-1}$,
t: flow time of the solution of polymer in toluene in seconds,
$t_0$: flow time of the toluene in seconds,
$\eta_{inh}$: intrinsic viscosity expressed in dl·g$^{-1}$.

Cold Flow (CF (1+6) 100° C.)

It is a matter of measuring the weight of elastomer extruded through a calibrated die over a given time (6 hours) and under fixed conditions (T=100° C.). The die has a diameter of 6.35 mm and a thickness of 0.5 mm and is located at the bottom and at the centre of a hollowed-out cylindrical dish with a diameter of 52 mm.

40±4 g of elastomer, formed beforehand into a pellet (thickness of 2 cm and diameter of 52 mm), are placed in this device. A calibrated piston weighing 1 kg (±5 g) is positioned on the elastomer pellet. The assembly is subsequently placed in an oven at 100±0.5° C.

As the conditions are not stabilized during the first hour in the oven, the product extruded at t=1 hour is cut off and then discarded.

The measurement is subsequently continued for 6 hours±5 min, during which the product is left in the oven. On conclusion of the 6 hours, the sample of product extruded is cut off and then weighed. The result of the measurement is the weight of elastomer weighed, expressed in g. The lower this result, the more resistant the elastomer is to cold flow.

Determination of the Number of Functions, in Mol Per Unit Mass of the Polymer: Determination of the Amount of (3-Glycidyloxypropyl)Methyldiethoxysilane (GMDE) Grafted to the Polybutadienes Obtained a) Principle:

This determination is carried out by an NMR analysis on coagulated samples.

The spectra are acquired on a Bruker Avance III HD 500 MHz spectrometer equipped with a Bruker cryo-BBFO z-grad 5 mm probe.

The 1D $^1$H NMR spectra are recorded using a single-pulse experiment with a tilt angle of 30°, the number of repetitions is 128 with a recycle delay of 5 seconds.

The experiments are carried out at 25° C.

b) Sample Preparation:

25 mg of sample are dissolved in 1 ml of carbon disulfide ($CS_2$); 70 μl of deuterated cyclohexane ($C_6D_{12}$) are added to the polymer solution for field-frequency lock.

c) Characterization:

The NMR spectra contain the signals characteristic of butadiene units (BR1-4 and BR1-2). In addition to these, isolated signals (of low intensity) attributed to the functionalizing agent, in this case the GMDE molecule, are observed. The $^1$H chemical shifts of the characteristic signals of this molecule in the BR matrix are presented in Table 1 below:

TABLE 1

Observable chemical shifts of GMDE in the BR matrix

| δ1H (ppm) | Attribution |
|---|---|
| 5.45 | —CH=CH$_2$ BR1-2 |
| 5.23 | —CH=CH— BR1-4 |
| 4.85 | —CH=CH$_2$ BR1-2 |
| 3.61 | —O—CH$_2$—CH$_3$ (GMDE) |
| 0.00 | —Si—CH$_3$ (GMDE) |
| 0.46 | —Si—CH$_2$— (GMDE) |

The quantifications were carried out from the integration of the 1D $^1$H NMR spectra using the Topspin software.

The integration zones considered for quantification are:

A: between 5.5 ppm and 5.0 ppm corresponding to 2 protons of BR1-4 and 1 proton of BR1-2

B: between 5.5 and 4.75 ppm corresponding to 2 protons of BR1-2

C: between 3.66 and 3.56 ppm corresponding to 2 protons of GMDE (—O—CH$_2$—CH$_3$ unit)

D: between 0.02 and −0.10 ppm corresponding to 3 protons of GMDE (—Si—CH$_3$ unit)

The microstructure can be quantified in molar percentage as follows:

mol % of a unit=$^1$H integral of a unit×100/Σ($^1$H integrals of each unit)

where:
$^1$H integral of BR1-4 unit=(A−(B/2))/2
$^1$H integral of BR1-2 unit=B/2
$^1$H integral of —O—CH$_2$—CH$_3$ GMDE unit=C/2
$^1$H integral of —Si—CH$_3$ GMDE unit=D/3

Using the integration of the 1D $^1$H NMR spectrum of the purified part of the sample: the quantification of the grafted GMDE unit can be carried out as molar percentage as described above.

Determination of the Molar Mass Distribution of the Polybutadienes Obtained by the Size Exclusion Chromatography (SEC) Technique a) Principle of the Measurement:

Size exclusion chromatography or SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) may be determined from commercial standards and the polydispersity index (PI=Mw/Mn) may be calculated via a "Moore" calibration.

b) Preparation of the Polymer:

There is no specific treatment of the polymer sample before analysis. The latter is simply dissolved in tetrahydrofuran at a concentration of approximately 1 g/l.

c) SEC Analysis:

Case c1) The apparatus used is a Waters Alliance chromatographic line. The elution solvent is tetrahydrofuran, the flow rate is 1 ml/min, the temperature of the system is 35° C. and the analytical time is 30 min. A set of two Waters columns with the trade name "Styragel HT6E" is used.

The volume of the solution of the polymer sample injected is 100 μl. The detector is a Waters 2140 differential refractometer and the software for making use of the chromatographic data is the Waters Millennium system.

Case c2) The apparatus used is a Waters Alliance chromatograph. The elution solvent is tetrahydrofuran, the flow rate is 0.7 ml/min, the temperature of the system is 35° C. and the analytical time is 90 min. A set of four Waters columns in series, with trade names "Styragel HMW7", "Styragel HMW6E" and two "Styragel HT6E", is used.

The volume of the solution of the polymer sample injected is 100 μl. The detector is a Waters model RI32X differential refractometer and the software for making use of the chromatographic data is the Waters Millennium system.

Synthesis of the Nd/Bd/DIBALH/DEAC Catalytic System

The Nd/Bd/DIBALH/DEAC catalytic system diluted in MCH is synthesized according to the procedure described in WO-A-02/38636 (pages 8 to 11):

In order to obtain this catalyst, the neodymium phosphate salt in powder form is introduced into a reactor previously cleaned of its impurities. This salt is then subjected to bubbling with nitrogen for 10 min with the aim of rendering the reaction medium inert. The following successive steps are then carried out:

First Step of Solvation:

A solvent consisting of pre-distilled MCH, purified on aluminas and bubbled with nitrogen, is introduced into the reactor. With a view to the formation of a gel, the duration and the temperature of bringing this solvent into contact with the neodymium salt are 30 min at 30° C. with stirring.

Second Step of Addition of the Monomer:

The butadiene purified beforehand on aluminas and bubbled with nitrogen is then introduced into the reactor at 30° C. This monomer will be used to preform the catalyst during the ageing step.

Third Step of Alkylation:

The DIBALH in solution in MCH is then introduced into the reactor as agent for alkylating the neodymium salt, at a concentration of approximately 1 mol/l. The alkylation time is 15 min. The temperature of the alkylation reaction is 30° C.

Fourth Step of Halogenation:

The DEAC in solution in MCH is then introduced into the reactor as halogen donor, at a concentration of approximately 0.5 mol/l. The temperature of the reaction medium is brought to 60° C.

Fifth Step of Ageing:

The mixture thus obtained is aged by maintaining the temperature of 60° C. for a period of 50 min.

The catalytic solution obtained is finally stored under a nitrogen atmosphere at a temperature of between −15° C. and −5° C.

The catalytic system is characterized by its catalytic formula which is given in the form Nd/Monomer/Alkylating agent/Halogenating agent in molar ratios indexed on the neodymium salt. In the examples, the catalytic formula is 1/36/3/2.6 with a neodymium concentration of 0.038 mol/l.

EXAMPLES

In these examples, the terms "total Al" are used to define the total amount of aluminium present in the reaction medium.

Comparative Example 1 (C1)

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 150 μmol of DIBALH per 100 g of butadiene and 600 μmol of the catalytic system described above per 100 g of butadiene are introduced.

The different flow rates are calculated in order for the mean residence time in the reactor to be 25 min. The temperature is maintained at 50° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.20 dl·g$^{-1}$. The number-average molar mass, $M_n$, determined by the SEC technique, is 90.000 g·mol$^{-1}$ and the polydispersity index, PI, is 1.90.

On leaving the polymerization reactor, at a temperature at least equal to the polymerization temperature, 4900 μmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.20 dl·g$^{-1}$.

The Mooney viscosity of this polymer C1 is 22.

The microstructure of this polymer is determined by the NIR method. The content of 1,4-cis units is 93.5% relative to the mass of polymer.

The glass transition temperature of this polymer is −107° C.

The cold flow CF (1+6)100° C. of the polymer is 1.678.

The number of functions measured by $^1$H NMR is 3.9 mmol/kg, i.e. an average percentage of functionalized chains of 57%.

Comparative Example 2 (C2)

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 150 μmol of DIBALH per 100 g of butadiene and 407 μmol of the catalytic system described above per 100 g of butadiene are introduced. The different flow rates are calculated in order for the mean residence time in the reactor to be 25 min. The temperature is maintained at 50° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.62 dl·g$^{-1}$. The number-average molar mass, $M_n$, determined by the SEC technique, is 182300 g·mol$^{-1}$ and the polydispersity index, PI, is 1.80.

On leaving the polymerization reactor, at a temperature at least equal to the polymerization temperature, 3200 μmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.62 dl·g$^{-1}$.

The Mooney viscosity of this polymer C2 is 39.

The microstructure of this polymer is determined by the NIR method. The content of 1,4-cis units is 96.4% relative to the mass of polymer.

The glass transition temperature of this polymer is −108° C.

The cold flow CF (1+6)100° C. of the polymer is 1.269.

The number of functions measured by $^1$H NMR is 2.74 mmol/kg, i.e. an average percentage of functionalized chains of 50%.

Comparative Example 3 (C3)

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 230 μmol of DIBALH per 100 g of butadiene and 450 μmol of the catalytic system described above per 100 g of butadiene are introduced.

The different flow rates are calculated in order for the mean residence time in the reactor to be 25 min. The temperature is maintained at 50° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.30 dl·g$^{-1}$. The number-average molar mass, $M_n$, determined by the SEC technique, is 150400 g·mol$^{-1}$ and the polydispersity index, PI, is 1.80.

On leaving the polymerization reactor, at a temperature at least equal to the polymerization temperature, 2600 μmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.30 dl·g$^{-1}$.

The Mooney viscosity of this polymer C3 is 24.

The microstructure of this polymer is determined by the NIR method. The content of 1,4-cis units is 98.2% relative to the mass of polymer.

The glass transition temperature of this polymer is −108° C.

The cold flow CF (1+6)100° C. of the polymer is 1.712.

The number of functions measured by $^1$H NMR is 2.52 mmol/kg, i.e. an average percentage of functionalized chains of 38%.

Comparative Example 4 (C4)

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 250 μmol of DIBALH per 100 g of butadiene and 238 μmol of the catalytic system described above per 100 g of butadiene are introduced.

The different flow rates are calculated in order for the mean residence time in the reactor to be 25 min. The temperature is maintained at 50° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.82 dl·g$^{-1}$. The number-average molar mass, $M_n$, determined by the SEC technique, is 195000 g·mol$^{-1}$ and the polydispersity index, PI, is 1.80.

On leaving the polymerization reactor, at a temperature at least equal to the polymerization temperature, 2300 μmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.82 dl·g$^{-1}$.

The Mooney viscosity of this polymer C4 is 37.

The microstructure of this polymer is determined by the NIR method. The content of 1,4-cis units is 98.6% relative to the mass of polymer.

The glass transition temperature of this polymer is −108° C.

The cold flow CF (1+6)100° C. of the polymer is 1.156.

The number of functions measured by $^1$H NMR is 1.90 mmol/kg, i.e. an average percentage of functionalized chains of 37%.

Example 1 (I1)

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 150 μmol of DIBALH per 100 g of butadiene and 600 μmol of the catalytic system described above per 100 g of butadiene are introduced.

The different flow rates are calculated in order for the mean residence time in the reactor to be 25 min. The temperature is maintained at 50° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.13 dl·g$^{-1}$. The number-average molar mass, $M_n$, determined by the SEC technique, is 140470 g·mol$^{-1}$ and the polydispersity index, PI, is 1.90.

At the outlet of the polymerization reactor, at a temperature at least equal to the polymerization temperature, 202 μmol, per 100 g of butadiene, of 4,4'-methylenebis(N,N-diglycidylaniline) in solution in toluene are added to the solution of living polymer with a (4,4'-methylenebis(N,N-diglycidylaniline))/(total Al) molar ratio of 0.10. Secondly, 4600 μmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.42 dl·g$^{-1}$.

The Mooney viscosity of this polymer I1 is 42.

The microstructure of this polymer is determined by the NIR method. The content of 1,4-cis units is 93.6% relative to the mass of polymer.

The glass transition temperature of this polymer is −107° C.

The cold flow CF (1+6)100° C. of the polymer is 0.20.

The number of functions measured by $^1$H NMR is 3.84 mmol/kg, i.e. an average percentage of functionalized chains of 54%.

Comparative Example 5 (C5): GMDE/TGMDA Co-Injection

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 150 μmol of DIBALH per 100 g of butadiene and 600 μmol of the catalytic system described above per 100 g of butadiene are introduced.

The different flow rates are calculated in order for the mean residence time in the reactor to be 25 min. The temperature is maintained at 50° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.15 dl·g$^{-1}$. The number-average molar mass, $M_n$, determined by the SEC technique, is 146170 g·mol$^{-1}$ and the polydispersity index, PI, is 1.80.

At the outlet of the polymerization reactor, at a temperature at least equal to the polymerization temperature, 202 μmol, per 100 g of butadiene, of 4,4'-methylenebis(N,N-diglycidylaniline) in solution in toluene are added to the solution of living polymer with a (4,4'-methylenebis(N,N-diglycidylaniline))/(total Al) molar ratio of 0.10. At the same time, 4600 μmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.20 dl·g$^{-1}$.

The Mooney viscosity of this polymer C5 is 22.

The microstructure of this polymer is determined by the NIR method. The content of 1,4-cis units is 93.4% relative to the mass of polymer.

The glass transition temperature of this polymer is −107° C.

The cold flow CF (1+6)100° C. of the polymer is 1.650.

The number of functions measured by $^1$H NMR is 3.63 mmol/kg, i.e. an average percentage of functionalized chains of 53%.

Comparative Example 6 (C6)

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 50 μmol of DIBALH per 100 g of butadiene and 530 μmol of the catalytic system described above per 100 g of butadiene are introduced.

The different flow rates are calculated in order for the mean residence time in the reactor to be 25 min. The temperature is maintained at 70° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.20 dl·g$^{-1}$. The number-average molar mass, $M_n$, determined by the SEC technique, is 146170 g·mol$^{-1}$ and the polydispersity index, PI, is 1.80.

On leaving the polymerization reactor, at a temperature at least equal to the polymerization temperature, 4200 μmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.20 dl·g$^{-1}$.

The Mooney viscosity of this polymer C6 is 22.

The microstructure of this polymer is determined by the NIR method. The content of 1,4-cis units is 92% relative to the mass of polymer.

The glass transition temperature of this polymer is −107° C.

The cold flow CF (1+6)100° C. of the polymer is 1.710.

The number of functions measured by $^1$H NMR is 3.15 mmol/kg, i.e. an average percentage of functionalized chains of 46%.

Example 2 (I2)

Methylcyclohexane and butadiene are continuously introduced into a 32 l continuously fed, stirred reactor, assumed to be perfectly stirred according to those skilled in the art.

The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 50 μmol of DIBALH per 100 g of butadiene and 530 μmol of the catalytic system described above per 100 g of butadiene are introduced. The different flow rates are calculated in order for the mean residence time in the reactor to be 25 min. The temperature is maintained at 70° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.20 dl·g$^{-1}$. The number-average molar mass, $M_n$, determined by the SEC technique, is 146170 g·mol$^{-1}$ and the polydispersity index, PI, is 1.80.

At the outlet of the polymerization reactor, at a temperature at least equal to the polymerization temperature, 202 µmol, per 100 g of butadiene, of 4,4'-methylenebis(N,N-diglycidylaniline) in solution in toluene are added to the solution of living polymer with a (4,4'-methylenebis(N,N-diglycidylaniline))/(total Al) molar ratio of 0.10. Secondly, 4200 µmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.31 dl·g$^{-1}$.

The Mooney viscosity of this polymer I2 is 27.

The microstructure of this polymer is determined by the NIR method. The content of 1,4-cis units is 92.8% relative to the mass of polymer.

The glass transition temperature of this polymer is –107° C.

The cold flow CF (1+6)100° C. of the polymer is 0.10.

The number of functions measured by $^1$H NMR is 3.20 mmol/kg, i.e. an average percentage of functionalized chains of 40%.

Comparative Example 7 (C7)

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 180 µmol of DIBALH per 100 g of monomer and 340 µmol of the catalytic system described above per 100 g of monomer are introduced.

The different flow rates are calculated in order for the mean residence time in the reactor to be 25 min. The temperature is maintained at 80° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C.

The "initial" intrinsic viscosity measured is 2.10 dl·g$^{-1}$. The number-average molar mass, $M_n$, determined by the SEC technique, is 150400 g·mol$^{-1}$ and the polydispersity index, PI, is 1.80.

On leaving the polymerization reactor, at a temperature at least equal to the polymerization temperature, 3700 µmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.17 dl·g$^{-1}$.

The Mooney viscosity of this polymer C7 is 24.

The microstructure of this polymer is determined by the NIR method. The content of 1,4-cis units is 94.2% relative to the mass of polymer.

The glass transition temperature of this polymer is –107° C.

The cold flow CF (1+6)100° C. of the polymer is 1.560.

The number of functions measured by $^1$H NMR is 1.86 mmol/kg, i.e. an average percentage of functionalized chains of 28%.

Comparative Example 8 (C8)

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 180 µmol of DIBALH per 100 g of monomer and 340 µmol of the catalytic system described above per 100 g of monomer are introduced.

The different flow rates are calculated in order for the mean residence time in the reactor to be 25 min. The temperature is maintained at 90° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.15 dl·g$^{-1}$. The number-average molar mass, $M_n$, determined by the SEC technique, is 149000 g·mol$^{-1}$ and the polydispersity index, PI, is 1.90.

On leaving the polymerization reactor, at a temperature at least equal to the polymerization temperature, 3700 µmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.15 dl·g$^{-1}$.

The Mooney viscosity of this polymer C8 is 23.

The microstructure of this polymer is determined by the NIR method. The content of 1,4-cis units is 94% relative to the mass of polymer.

The glass transition temperature of this polymer is −107° C.

The cold flow CF (1+6)100° C. of the polymer is 1.40.

The number of functions measured by $^1$H NMR is not detectable.

Example 3 (I3)

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 150 μmol of DIBALH per 100 g of butadiene and 600 μmol of the catalytic system described above per 100 g of butadiene are introduced.

The different flow rates are calculated in order for the mean residence time in the reactor to be 25 min. The temperature is maintained at 50° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.21 dl·g$^{-1}$. The number-average molar mass, $M_n$, determined by the SEC technique, is 147290 g·mol$^{-1}$ and the polydispersity index, PI, is 1.90.

At the outlet of the polymerization reactor, at a temperature at least equal to the polymerization temperature, 102 μmol, per 100 g of butadiene, of 4,4'-methylenebis(N,N-diglycidylaniline) in solution in toluene are added to the solution of living polymer with a (4,4'-methylenebis(N,N-diglycidylaniline))/(total Al) molar ratio of 0.10. Secondly, 4800 μmol, per 100 g of butadiene, of (3-glycidyloxypropyl)methyldiethoxysilane in solution in methylcyclohexane are added to the solution of living polymer in a ((3-glycidyloxypropyl)methyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.40 dl·g$^{-1}$.

The Mooney viscosity of this polymer I3 is 40.

The microstructure of this polymer is determined by the NIR method. The content of 1,4-cis units is 94% relative to the mass of polymer.

The glass transition temperature of this polymer is −107° C.

The cold flow CF (1+6)100° C. of the polymer is 0.18.

The number of functions measured by $^1$H NMR is 3.66 mmol/kg, i.e. an average percentage of functionalized chains of 54%.

Example 4 (I4)

Methylcyclohexane and butadiene are continuously introduced into a 32 l continuously fed, stirred reactor, assumed to be perfectly stirred according to those skilled in the art. The mass flow rate of butadiene is 5.30 kg·h$^{-1}$ and the mass concentration of butadiene in the methylcyclohexane/butadiene mixture is 9% by weight.

Diisobutylaluminium hydride (DIBALH) is introduced in sufficient amount to neutralize the protic impurities introduced by the various constituents present in the inlet of the first reactor. At the inlet of the reactor, 150 μmol of DIBALH per 100 g of butadiene and 600 μmol of the catalytic system described above per 100 g of butadiene are introduced.

The different flow rates are calculated in order for the mean residence time in the reactor to be 25 min. The temperature is maintained at 50° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 2.23 dl·g$^{-1}$. The number-average molar mass, $M_n$, determined by the SEC technique, is 149000 g·mol$^{-1}$ and the polydispersity index, PI, is 1.80.

At the outlet of the polymerization reactor, at a temperature at least equal to the polymerization temperature, 102 μmol, per 100 g of butadiene, of 4,4'-methylenebis(N,N-diglycidylaniline) in solution in toluene are added to the solution of living polymer with a (4,4'-methylenebis(N,N-diglycidylaniline))/(total Al) molar ratio of 0.10. Secondly, 4800 μmol, per 100 g of butadiene, of 3-isocyanatopropylmethyldiethoxysilane in solution in methylcyclohexane are added to the solution of living polymer in a (3-isocyanatopropylmethyldiethoxysilane)/(total Al) molar ratio of 2.5.

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.48 dl·g$^{-1}$.

The Mooney viscosity of this polymer I4 is 44.

The microstructure of this polymer is determined by the NIR method. The content of 1,4-cis units is 94% relative to the mass of polymer.

The glass transition temperature of this polymer is −107° C.

The cold flow CF (1+6)100° C. of the polymer is 0.063.

The number of functions measured by $^1$H NMR is 3.66 mmol/kg, i.e. an average percentage of functionalized chains of 54%.

The comparison of Comparative Examples 1 and 2 versus Comparative Examples 3 and 4 shows that it is preferable, whatever the molar mass obtained, to have the lowest possible total Al/Nd salt ratio in order to obtain a high content of functionalized chains.

The comparison of Example 1 and Comparative Example 5 shows that it is preferable to add the polyfunctional compound before the functionalizing agent in order to obtain a high content of functionalized chains and a reduced flow.

The comparison of Comparative Examples 1, 6, 7 and 8 shows the impact of the polymerization temperature on the content of functionalized chains.

The comparison of Comparative Examples 1 and 3 or of Comparative Examples 6 and 2 shows the beneficial effect of the addition of a polyfunctional compound in order to obtain a reduced flow and to maintain a high content of functionalized chains.

|  | C1 | C2 | C3 | C4 | I1 | C5 |
| --- | --- | --- | --- | --- | --- | --- |
| Nd concentration (μmcm) | 600 | 407 | 230 | 238 | 600 | 600 |
| Total* Al/Nd ratio | 3.2 | 3.4 | 5 | 5 | 3.2 | 3.2 |
| Polymerization temperature (°C.) | 50 | 50 | 50 | 50 | 50 | 50 |
| Initial intrinsic viscosity (dl/g) | 2.20 | 2.62 | 2.30 | 2.82 | 2.13 | 2.15 |
| Functionalizing agent/total Al | 2.5 | 2.5 | 2.5 | 2.5 | 2.5 | 2.5 |
| Polyfunctional compound/total Al | 0 | 0 | 0 | 0 | 0.10 | 0.10 |
| Final intrinsic viscosity (dl/g) | 2.20 | 2.62 | 2.30 | 2.82 | 2.42 | 2.20 |
| Final Mooney | 22 | 39 | 24 | 45 | 42 | 22 |
| $M_n$ (g/mol) – initial PI | 146170 – 1.8 | 182300 – 1.8 | 150400 – 1.8 | 195000 – 1.8 | 140470 – 1.9 | 146170 – 1.8 |
| Average % of functionalized chains** | 57 | 50 | 38 | 37 | 54 | 53 |
| Number of functions (mmol/kg) | 3.9 | 2.74 | 2.52 | 1.90 | 3.84 | 3.63 |
| % cis-1,4 | 93.5 | 96.4 | 98.2 | 98.6 | 93.6 | 93.4 |
| Tg (°C.) | −107 | −108 | −108 | −108 | −107 | −107 |
| Cold flow (g/6 h) | 1.678 | 1.269 | 1.712 | 1.156 | 0.20 | 1.650 |

|  | C6 | I2 | C7 | C8 | I3 | I4 |
| --- | --- | --- | --- | --- | --- | --- |
| Nd concentration (μmcm) | 530 | 530 | 340 | 340 | 600 | 600 |
| Total* Al/Nd ratio | 3.2 | 3.2 | 3.5 | 3.2 | 3.2 | 3.2 |
| Polymerization temperature (°C.) | 70 | 70 | 80 | 90 | 50 | 50 |
| Initial intrinsic viscosity (dl/g) | 2.20 | 2.20 | 2.10 | 2.10 | 2.21 | 2.23 |
| Functionalizing agent/total Al | 2.5 | 2.5 | 2.5 | 2.5 | 2.5 | 2.5 |
| Polyfunctional compound/total Al | 0 | 0.10 | 0 | 0 | 0.05 | 0.05 |
| Final intrinsic viscosity (dl/g) | 2.20 | 2.31 | 2.17 | 2.15 | 2.40 | 2.48 |
| Final Mooney | 22 | 27 | 24 | 23 | 40 | 44 |
| $M_n$ (g/mol) – initial PI | 145800 – 1.8 | 147100 – 1.8 | 150400 – 1.8 | 150000 – 1.9 | 147290 – 1.8 | 149000 – 1.8 |
| Average % of functionalized chains** | 46 | 40 | 28 | 0 | 54 | 58 |
| Number of functions (mmol/kg) | 3.15 | 3.20 | 1.86 | ND | 3.66 | 3.89 |
| % cis-1,4 | 92 | 92.8 | 94.2 | 94 | 94 | 94 |
| Tg (°C.) | −107 | −107 | −107 | −107 | −107 | −107 |
| Cold flow (g/6 h) | 1.710 | 0.10 | 1.562 | 1.400 | 0.18 | 0.063 |

*The total Al is calculated by taking into account the DIBALH of the catalyst (Nd/Al ratio of 3) and the DIBALH added in the polymerization reaction.

**The average percentage of functionalized chains (in %) is obtained by the formula: $(CH_2\text{—}Si/PB) \times M_n \times 1.10^{-4}$ with $CH_2\text{—}Si/PB$ in mmol/kg and $M_n$ in g·mol$^{-1}$.

The invention claimed is:

1. A process for preparing a functionalized polybutadiene, comprising the following steps:
   a) homopolymerizing butadiene by means of a catalytic system so as to form a pseudo-living elastomer, said catalytic system being based on at least:
      one conjugated diene monomer,
      a salt of one or more rare earth metals of an organic phosphoric acid,
      an aluminium-containing alkylating agent, and
      a halogen donor, comprising an alkylaluminium halide,
      said salt is in suspension or in solution in at least one saturated inert hydrocarbon-based solvent of aliphatic or alicyclic type;
   b) adding a polyfunctional compound comprising at least three functional groups to the pseudo-living elastomer formed in step (a), said functional group being capable of reacting with the reactive end of the pseudo-living elastomer;
   c) adding a functionalizing agent corresponding to the formula A-$R_i$—B to the mixture formed in step (b), with A denoting a group capable of reacting with the reactive end of the pseudo-living elastomer, $R_i$ denoting an atom or a group of atoms forming a bond between A and B, and B denoting a function capable of reacting with a reinforcing filler; and
   d) recovering the functionalized polybutadiene;
the total molar amount of aluminium in the polymerization medium is such that the (aluminium/rare earth salt) molar ratio has a value between 1 and 5 and the polymerization is carried out at a temperature between 40° C. and 90° C.

2. The process according to claim 1, wherein, in the catalytic system, the aluminium to rare earth salt molar ratio has a value between 1 and 4.

3. The process according to claim 1, wherein the polymerization is carried out at a temperature between 45° C. and 75° C.

4. The process according to claim 1, wherein, in the catalytic system, said salt is neodymium tris[bis(2-ethylhexyl)phosphate].

5. The process according to claim 1, wherein the functionalizing agent to aluminium molar ratio is at least 1.

6. The process according to claim 1, wherein for the functionalizing agent of formula A-$R_i$—B, A is selected from glycidylaminos, isocyanates, imines and imidazoles.

7. The process according to claim 1, wherein for the functionalizing agent of formula A-$R_i$—B, B is a dialkoxysilane.

8. The process according to claim 1, wherein for the functionalizing agent of formula A-$R_i$—B, $R_i$ is an aliphatic divalent $C_1$-$C_{10}$ radical.

9. The process according to claim 1, wherein the polyfunctional compound to aluminium molar ratio is less than 0.3.

10. The process according to claim 1, wherein the polyfunctional compound corresponds to the formula $(E)_n$-$R_j$, with n denoting an integer greater than or equal to 3, E denoting said functional group and $R_j$ denoting an atom or a group of atoms bearing the n groups E.

11. The process according to claim 1, wherein in the polyfunctional compound, said functional group is selected from glycidylaminos, isocyanates, imines and imidazoles.

12. The process according to claim 1, wherein the polyfunctional compound is tetraglycidylaminodiphenylmethane.

13. A functionalized polybutadiene obtained by the process according to claim 1, comprising free polybutadiene chains having reacted only with the functionalizing agent and polybutadiene chains bonded together via the polyfunctional compound and the functionalized polybutadiene having
   a molar content of 1,4-cis unit linkage of at least 90% relative to the polybutadiene;
   a polydispersity index of less than 2.3;
   an average percentage of functionalized chains greater than 25%;
   a Mooney viscosity ML (1+4) at 100° C. greater than or equal to 40;
   a cold flow CF (1+6) value at 100° C. of less than 1 g.

14. The functionalized polybutadiene according to claim 13, having an average content of functionalized chains of between 25% and 60%.

15. The functionalized polybutadiene according to claim 13, having an average content of functionalized chains of between 40% and 80%.

16. A rubber composition comprising a functionalized polybutadiene according to claim 13 and a reinforcing inorganic filler.

17. The process according to claim 2, wherein, in the catalytic system, the aluminium to rare earth salt molar ratio has a value ranging from 2.5 to 3.

18. The process according to claim 7, wherein for the functionalizing agent of formula A-$R_i$—B, B is a diethoxysilane.

19. A functionalized polybutadiene according to claim 13, comprising a cold flow CF (1+6) value at 100° C. of less than 0.5 g.

* * * * *